(12) United States Patent
Nadeau et al.

(10) Patent No.: US 9,157,329 B2
(45) Date of Patent: Oct. 13, 2015

(54) GAS TURBINE ENGINE AIRFOIL INTERNAL COOLING FEATURES

(75) Inventors: Daniel C. Nadeau, Wethersfield, CT (US); Jeffrey R. Levine, Vernon Rockville, CT (US); Dominic J. Mongillo, Jr., West Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 549 days.

(21) Appl. No.: 13/591,773

(22) Filed: Aug. 22, 2012

(65) Prior Publication Data

US 2014/0056717 A1 Feb. 27, 2014

(51) Int. Cl.
*F01D 5/18* (2006.01)

(52) U.S. Cl.
CPC .......... *F01D 5/186* (2013.01); *F05D 2240/127* (2013.01); *F05D 2240/305* (2013.01); *F05D 2240/306* (2013.01); *F05D 2260/202* (2013.01); *F05D 2260/2212* (2013.01); *F05D 2260/22141* (2013.01); *Y02T 50/676* (2013.01)

(58) Field of Classification Search
CPC ... F01D 5/186; F01D 25/08; F05D 2240/305; F05D 2240/306; F05D 2260/202; F05D 2260/22141; F05D 2260/2212
USPC ........................................ 415/115; 416/97 R
See application file for complete search history.

(56) References Cited

U.S. PATENT DOCUMENTS

| | | | | |
|---|---|---|---|---|
| 5,052,889 | A * | 10/1991 | Abdel-Messeh | 416/97 R |
| 5,288,207 | A | 2/1994 | Linask | |
| 5,395,212 | A * | 3/1995 | Anzai et al. | 416/97 R |
| 5,413,458 | A | 5/1995 | Calderbank | |
| 5,695,321 | A * | 12/1997 | Kercher | 416/97 R |
| 5,700,131 | A | 12/1997 | Hall et al. | |
| 5,797,726 | A * | 8/1998 | Lee | 416/96 R |
| 5,931,638 | A | 8/1999 | Krause et al. | |
| 6,331,098 | B1 * | 12/2001 | Lee | 416/97 R |
| 7,118,337 | B2 * | 10/2006 | Liang | 416/1 |
| 2007/0231138 | A1 | 10/2007 | Levine et al. | |
| 2013/0236330 | A1 * | 9/2013 | Lee | 416/97 R |

OTHER PUBLICATIONS

International Search Report and Written Opinion for International Application No. PCT/US2013/051796 completed on Oct. 15, 2013.
International Preliminary Report on Patentability for International Application No. PCT/US2013/051796 mailed Mar. 5, 2015.

* cited by examiner

*Primary Examiner* — Ninh H Nguyen
(74) *Attorney, Agent, or Firm* — Carlson, Gaskey & Olds, P.C.

(57) ABSTRACT

An airfoil for a gas turbine engine includes spaced apart pressure and suction walls joined at leading and trailing edges to provide an airfoil. Intermediate walls interconnect the pressure and suction walls to provide cooling passageways. The cooing passageways have interior pressure and suction surfaces that are respectively provided on the pressure and suction walls. Trip strips include a chevron-shaped trip strip that is provided on at least one of the interior pressure and suction surfaces.

17 Claims, 4 Drawing Sheets

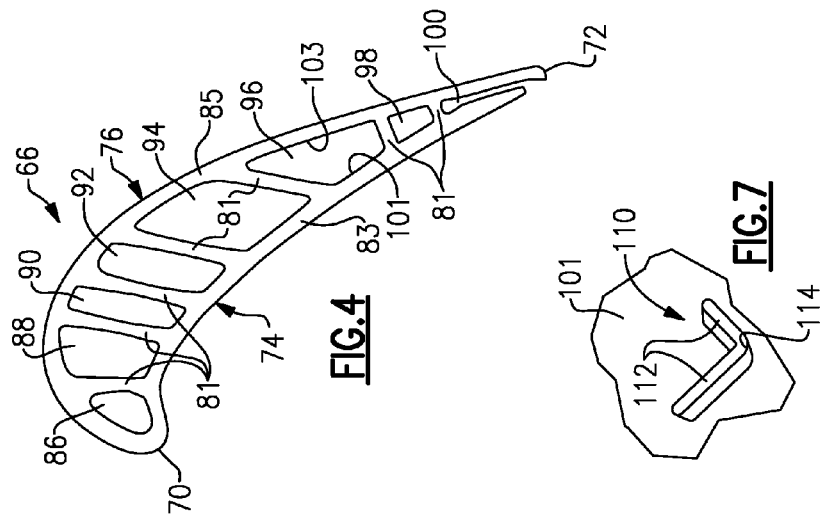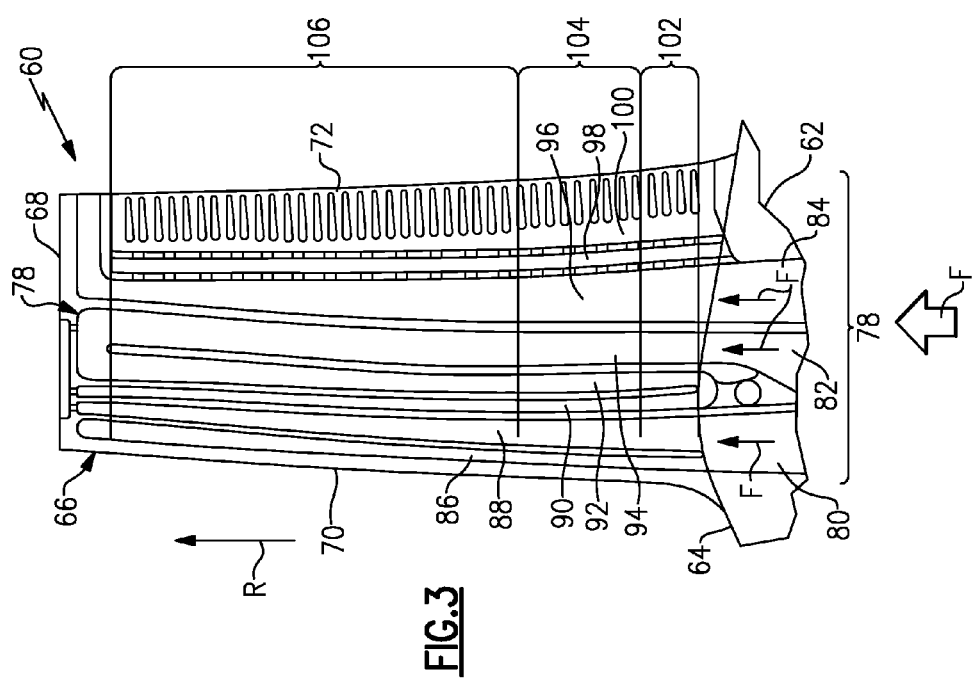

GAS TURBINE ENGINE AIRFOIL INTERNAL COOLING FEATURES

BACKGROUND

This disclosure relates to a gas turbine engine airfoil. In particular, the disclosure relates to the airfoil's internal cooling features.

In one example gas turbine engine airfoil, multiple cooling passageways extend radially within the airfoil. Three discrete feed cavities are provided in the root. A leading edge feed cavity includes two cooling passageways, a midbody feed cavity includes three cooling passageways, and a trailing edge cavity includes three cooling passageways. Only skewed trip strips are provided on the walls defining the cooling passageways to transfer heat to the cooling fluid flowing through the cooling passageways.

The trip strip layout uses skewed trip strips from 10%-30% span, and no trip strips from 0%-10% span. From 10% to 30% span, the trip strip height is 0.010 inch (0.25 mm) with a P/E (trip radial pitch to trip height) of 10. Pitch is the spacing between adjacent trip strips, From 30% to 100% span, the trip strip height of the skewed trip strips is 0.0115 inch (0.38 mm) and the PIE is 5 for the leading edge and midbody cooling passageways. For the trailing edge cooling passageways, the trip strip height from 30%-100% span is 0.012 inch (0.30 mm) with a PIE of 6.25.

SUMMARY

In one exemplary embodiment, an airfoil for a gas turbine engine includes spaced apart pressure and suction walls joined at leading and trailing edges to provide an airfoil. Intermediate walls interconnect the pressure and suction walls to provide cooling passageways. The cooing passageways have interior pressure and suction surfaces that are respectively provided on the pressure and suction walls. Trip strips include a chevron-shaped trip strip that is provided on at least one of the interior pressure and suction surfaces.

In a further embodiment of any of the above, the airfoil extends in a radial direction from a platform supported on a root to a tip. The cooling passageways extend in the radial direction.

In a further embodiment of any of the above, the chevron-shaped trip strip includes protrusions joined at an apex. The apex faces a flow direction within the cooling passageway.

In a further embodiment of any of the above, feed cavities are provided in the root and are fluidly connected to the cooling passageways. Each feed cavity has an inlet discrete from the other feed cavities. The cooling passageways are spaced apart from one another in a chord-wise direction that extends between the leading and trailing edges.

In a further embodiment of any of the above, the feed cavities correspond to leading edge, midbody and trailing edge feed cavities. The leading edge feed cavity has first and second cooling passageways. The midbody feed cavity has third, fourth and fifth cooling passageways. The trailing edge feed cavity has sixth, seventh and eighth cooling passageways.

In a further embodiment of any of the above, the airfoil includes first, second and third span regions extending along a span that extends in the radial direction from 0% span near the platform to 100% span near the tip. The first span region extends 0-20% the span +/−5%. The second span region extends 20-60% the span +/−5%. The third span region extends 60-100% the span +/−5%.

In a further embodiment of any of the above, the first, second and third span regions have different average P/E ratios, wherein P is a pitch of the trip strips, and E is a height of the trip strip with respect to a support surface of the trip strip.

In a further embodiment of any of the above, the height of trip strips within the first and second span regions in the leading edge and midbody feed cavities is 0.015 inch (0.38 mm) +/−0.002 inch (0.05 mm).

In a further embodiment of any of the above, the first span region in the leading edge and midbody feed cavities has an average P/E ratio of 6.7+/−0.3.

In a further embodiment of any of the above, the second span region in the leading edge and midbody feed cavities has an average P/E ratio of 5.0+/−0.3.

In a further embodiment of any of the above, the height of trip strips within the first and second span regions in the trailing edge feed cavity is 0.012 inch (0.30 mm) +/−0.002 inch (0.05 mm).

In a further embodiment of any of the above, the first span region in the trailing edge feed cavity has an average P/E ratio of 8.3+/−0.3.

In a further embodiment of any of the above, the second span region in the trailing edge feed cavity has an average P/E ratio of 6.3+/−0.3.

In a further embodiment of any of the above, the trip strips include single linear trip strips skewed relative to the flow direction.

In a further embodiment of any of the above, the chevron trip strips extend from 0% to 60% span +/−5% in the second and sixth cooling passageways.

In a further embodiment of any of the above, the chevron trip strips extend from 0% to 100% span +/−5% in the fifth cooling passageway.

In a further embodiment of any of the above, the from 0% to 20% span +/−5% includes no trip strips on the suction surface.

In a further embodiment of any of the above, the from 0% to 20% span +/−5% includes trip strips on the interior pressure surface.

In a further embodiment of any of the above, the pressure and suction surfaces include different trip strip configurations.

In a further embodiment of any of the above, the different trip strip configuration includes skewed and chevron features.

In a further embodiment of any of the above, the protrusions are of unequal length.

BRIEF DESCRIPTION OF THE DRAWINGS

The disclosure can be further understood by reference to the following detailed description when considered in connection with the accompanying drawings wherein:

FIG. 3 is a schematic cross-sectional view through the blade shown in FIG. 2 taken along line 3-3.

FIG. 4 is a cross-sectional view taken through the airfoil in FIG. 2 along line 4-4.

FIG. 7 is a perspective view of an example chevron-shaped trip strip on an interior surface of a cooling passageway of the airfoil.

DETAILED DESCRIPTION

Figure 1:
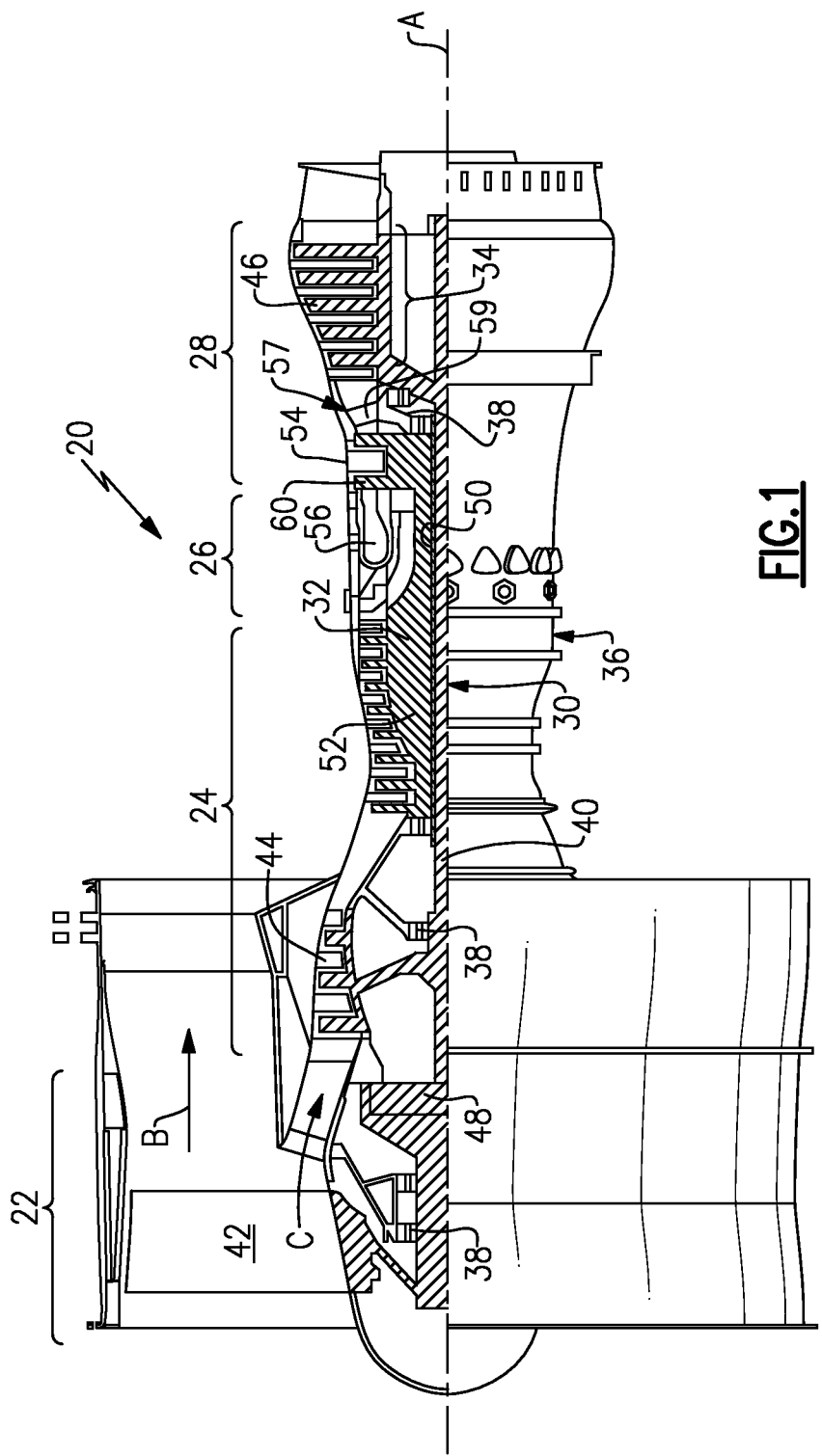
FIG. 1 is a schematic cross-sectional view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 m). The flight condition of 0.8 Mach and 35,000 ft (10,668 m), with the engine at its best fuel consumption—also known as "bucket cruise Thrust Specific Fuel Consumption ('TSFC')"—is the industry standard parameter of 1 bm of fuel being burned per hour divided by 1 bf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in ft/sec divided by an industry standard temperature correction of $[(\text{Tram} \ °\text{R})/(518.7° \text{R})]^{0.5}$. The "Low corrected fan tip speed" as disclosed herein according to one non-limiting embodiment is less than about 1150 ft/second (350.52 m/second).

Figure 2:
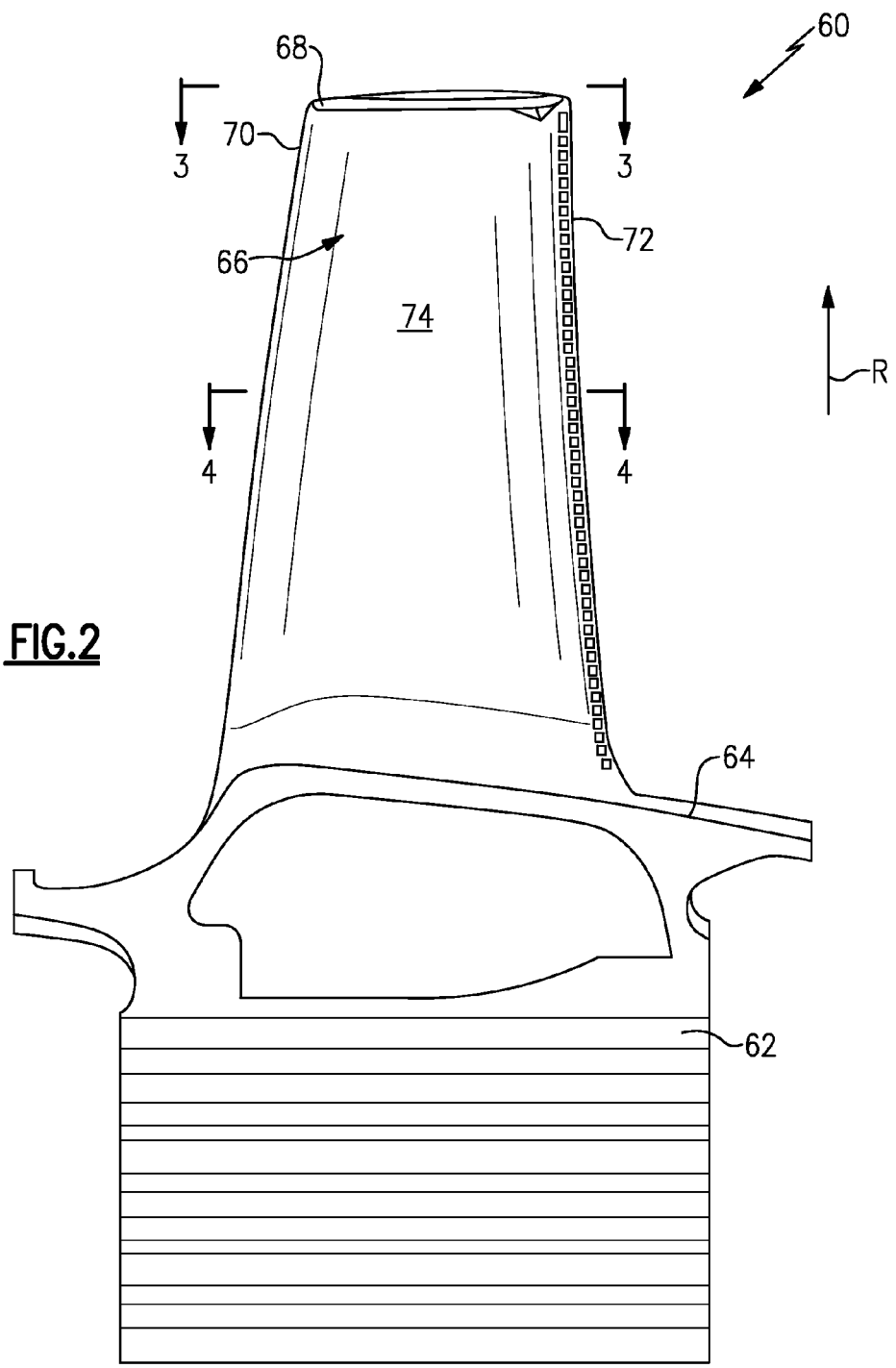
FIG. 2 is a perspective view of an example turbine blade.

Referring to FIG. 2, an example turbine blade 60 is illustrated, which may be suitable for the high pressure turbine 54, for example. In one example, the turbine blade 60 is used in a first stage of the high pressure turbine 54, although the disclosed internal cooling features may be used for any blade or stator vane, or other components within a gas turbine engine.

The turbine blade 60 includes an airfoil 66 extending in a radial direction R from a platform 64, which is supported by a root 62, to a tip 68. The airfoil 66 includes pressure and suction sides 74, 76 extending in the radial direction R and joined at a leading edge 70 and a trailing edge 72, as shown in FIGS. 2-4.

FIG. 3 schematically illustrates the cooling passages 78 within the airfoil 66. The cooling passages 78 are supplied with cooling fluid F by first, second and third feed cavities 80, 82, 84. The inlets to the feed cavities 80, 82, 84 are discrete from one another. In the example airfoil 66, eight cooling passageways 86-100 are provided. The first feed cavity 80 supplies cooling fluid F to first and second cooling passageways 86, 88. The first and second cooling passageways 86, 88 are both connected directly to the first feed cavity 80 and terminate near the tip 68. The second feed cavity 82 supplies cooling fluid F to a serpentine cooling passage provided by third, fourth and fifth cooling passageways 90, 92, 94. The third feed cavity 84 supplies cooling fluid to sixth, seventh and eighth cooling passageways 96, 98, 100. The sixth cooling passageway 96 terminates in a tip flag near the tip 68. The eighth cooling passageway 100 provides trailing edge cooling exits at the trailing edge 72 of the airfoil 66. The cooling passageways 86-100 are spaced apart from one another in a chord-wise direction that extends from the leading edge 70 to the trailing edge 72. The cooling passageways 86-100 extend in the radial direction R from the platform 64 to the tip 68.

The airfoil 66 can be divided from a design standpoint into first, second and third span regions 102, 104, 106. The first span region 102 is provided near the platform 64, and the third span region 106 is provided near the tip 68. The second span region 104 is arranged radially between the first and third span regions 102, 106. The span extends in the radial direction from a 0% span near the platform 64 to a 100% span near the tip 68. The first span region extends 0-20% the span +/−5%, the second span region extends 20-60% the span +/−5%, and the third span region 106 extends 60-100% the span +/−5%.

Referring to FIG. 4, the airfoil 66 is provided by spaced apart pressure and suction walls 83, 85 that are joined at leading and trailing edges 70, 72. Intermediate walls 81 interconnect the pressure and suction walls 83, 85 to provide the cooling passages 78. Each of the cooling passageways 86-100 include interior pressure and suction surfaces 101, 103, which are respectively provided by the pressure and suction walls 83, 85.

Chevron trips strips may be used in conjunction with alternate trip strip configurations (i.e. skewed, normal, segmented, etc.) within a given cooling flow circuit or passage. Management of varying radial and axial external heat load along the airfoil surface is necessary to achieve aggressive turbine performance, cooling flow, and life goals. Sequence of trip strip configuration array types (chevron, skewed, normal etc.) within a cooling circuit or cooling passage may vary enabling more flexibility and tailoring of unique trip strip array arrangements to address local convective cooling requirements. Chevron trip strips may be used in the highest heat load area and then transition to skewed trip strips in lower heat load locations better balancing local metal temperatures in said region, resulting in lower thermal strains and improved oxidation and thermal mechanical fatigue capability.

Figure 6:
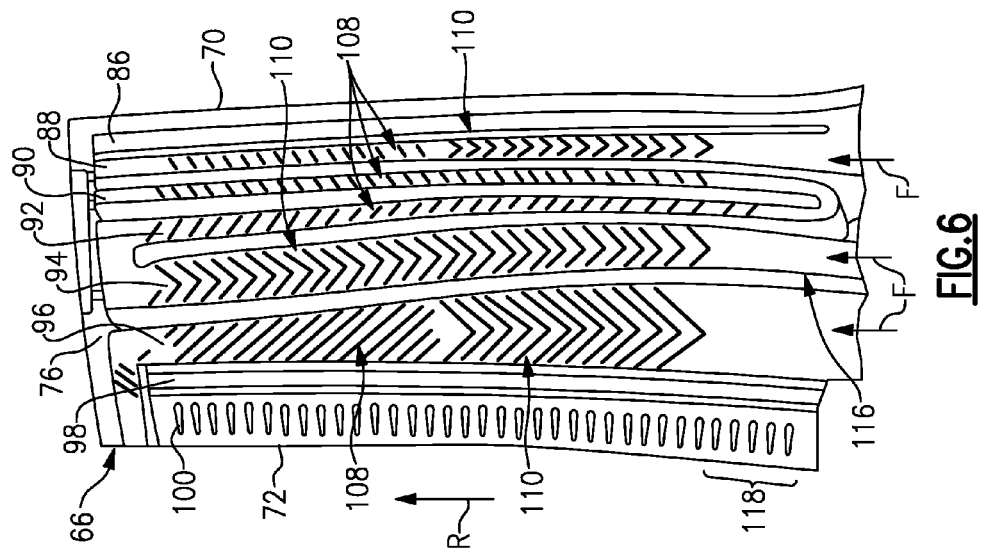
FIG. 6 is a view of the airfoil cooling passageways illustrating the internal cooling features on a suction side of the airfoil.
Figure 5:
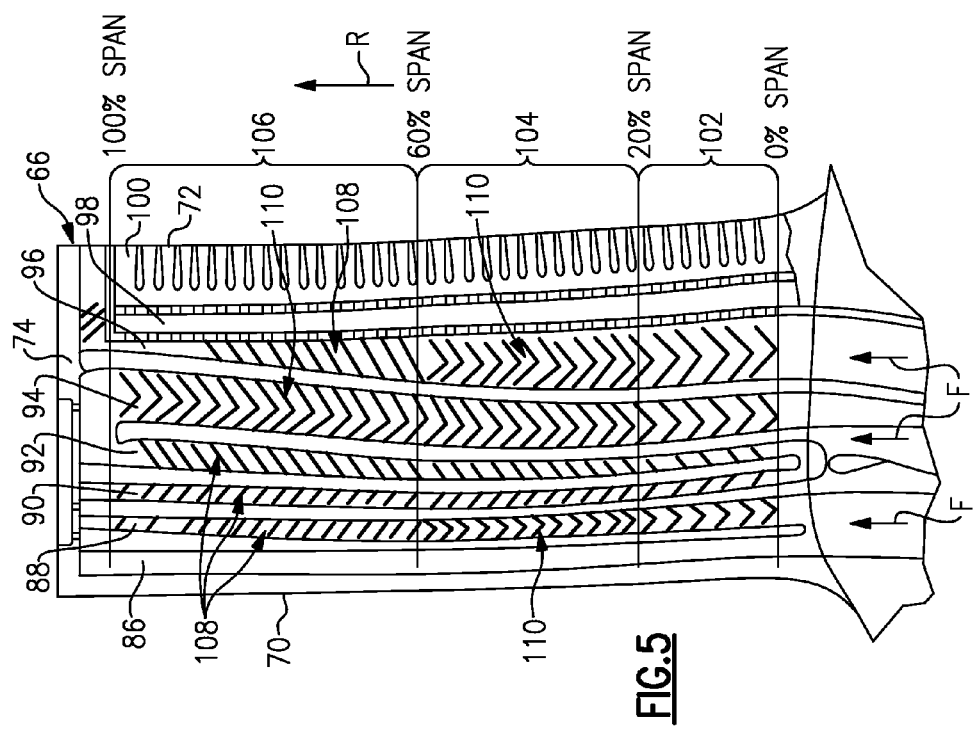
FIG. 5 is a view of the airfoil cooling passageways illustrating the internal cooling features on a pressure side of the airfoil.

Referring to FIGS. 5 and 6, the cooling passageways are illustrated with cooling features that provide both desired heat transfer and pressure drop. In the example, a first trip strip geometry 108 is used to provide first heat transfer and pressure drop characteristics. A second trip strip geometry 110 corresponding to a chevron-shape provides second heat transfer and pressure drop characteristics that are different than those provided by the first trip strip geometry 108. In the example, the first trip strip geometry 108 is provided by a single linear trip strip skewed relative to the flow direction through the respective cooling passageway.

As shown in FIG. 7, chevron-shaped trip strips 110 are provided in at least some of the cooling passageways 86-100. The chevron trip strips 110 include protrusions 112 arranged in a V-shape forming an apex 114. The apex 114 faces the flow direction. The use of chevron trip strips 110 reduces the possibility of airfoil cracking by maximizing heat transfer and reducing temperatures at the expense of pressure drop in the locations 0%-30% span. This is achieved by employing chevron trip strips along at least some locations from 0% to 60% span in all three feed cavities 102-106.

The individual segment length of the chevron trip strip protrusions may vary, depending on the desired flow characteristics of the chevron, and may be unequal, as shown in FIG. 7. Where required, non uniform segment lengths result in different boundary layer growth along each unique segment length of the chevron trip strip, resulting in more or less local convective heat transfer, The non-uniformity in local convective heat transfer enables the local thermal cooling effectiveness to be tailored and distributed to improve local internal convective heat transfer where required to offset or mitigate regions of high local heat load.

The midbody feed cavity 82 has the chevron trip strips 110 extending from 0% to 100% span in the fifth cooling passageway 94. The use of chevron trip strips provide an additional 20%-25% of heat transfer for same amount of pressure drop when compared to using skewed trip strips only. This configuration allows a greater temperature reduction in the locations of the chevron trip strips, primarily in the 0%-30% span area, which may be susceptible to cracking.

Chevron trip strips 110 are provided from 0% to 60% span +/−5% in the second and sixth cooling passageways 88, 96, From 0% to 20% span +/−5% of the leading edge and midbody feed cavities 80, 82, the trip strips 108, 110 are designed to have a height of 0.015 inch (0.38 mm) +/−0.002 inch (0.05 mm) and a P/E of 6.7+/−0.3, while the trailing edge cavity 84 has a height of 0.012 inch (0.30 mm) +/−0.002 inch (0.05 mm) and a PIE of 8.3+/−0.3. From 20% to 60% span +/−5% of the leading edge and midbody feed cavities 80, 82 the height remains at 0.015 inch (0.38 mm) +/−0.002 inch (0.05 mm) while the P/E changes to 5.0+/−0.3, while the trailing edge cavity 84 height remains at 0.012 inch (0.30 mm) +/−0.002 inch (0.05 mm) and a PIE of 6.25+/−0.3. To improve the heat transfer even more at the 0%-20% span location, all trip strips were removed from the suction side 72 of the feed cavities 80-84 from 0% to 20% +/−5% span 118 in the region 116, best shown in FIG. 6. Eliminating these trips strips minimizes the pressure loss in this region 116 while increasing the heat transfer on the pressure side interior surface 101 and further reducing the temperatures in the 0%-30% span. It should be understood that trip strip heights of 0.007-0.020 inch (0.18-0.51 mm) and P/E ratios of 4-12 may be used.

Although an example embodiment has been disclosed, a worker of ordinary skill in this art would recognize that certain modifications would come within the scope of the claims. For that reason, the following claims should be studied to determine their true scope and content.

What is claimed is:
1. An airfoil for a gas turbine engine comprising:
spaced apart pressure and suction walls at leading and trailing edges to provide an airfoil, intermediate walls interconnecting the pressure and suction walls to provide cooling passageways, the cooling passagways having interior pressure and suction surfaces respectively provided on the pressure and suction walls; and
trip strips including a chevron-shaped trip strip that is provided on at least one of the interior pressure and suction surfaces, wherein the airfoil includes first, second and third span regions extending along a span that extends in the radial direction from 0% span near the platform to 100% span near the tip, the first span region extending 0-20% the span +/−5%, the second span region extending 20-60% the span +/−5%, and the third span region extending 60-100% the span +/−5%, wherein the first, second and third span regions have different average P/E ratios, wherein P is a pitch of the trip strips, and E is a height of the trip strip with respect to a support surface of the trip strip.
2. The airfoil according to claim 1, wherein the chevron-shaped trip strip includes protrusions joined at an apex, the apex facing a flow direction within the cooling passageway.
3. The airfoil according to claim 2, wherein the trip strips include single linear trip strips skewed relative to the flow direction.
4. The airfoil according to claim 2, wherein the protrusions are of unequal length.
5. The airfoil according to claim 1, wherein each feed cavity having an inlet discrete from the other feed cavities, the cooling passageways spaced apart from one another in a chord-wise direction that extends between the leading and trailing edges.

6. The airfoil according to claim 1, wherein the height of trip strips within the first and second span regions in the leading edge and midbody feed cavities is 0.015 inch (0.38 mm) +/−0.002 inch (0.05 mm).

7. The airfoil according to claim 6, wherein the first span region in the leading edge and midbody feed cavities has an average P/E ratio of 6.7 +/−0.3.

8. The airfoil according to claim 6, wherein the second span region in the leading edge and midbody feed cavities has an average P/E ratio of 5.0 +/−0.3.

9. The airfoil according to claim 1, wherein the height of trip strips within the first and second span regions in the trailing edge feed cavity is 0.012 inch (0.30 mm) +/−0.002 inch (0.05 mm).

10. The airfoil according to claim 9, wherein the first span region in the trailing edge feed cavity has an average P/E ratio of 8.3 +/−0.3.

11. The airfoil according to claim 9, wherein the second span region in the trailing edge feed cavity has an average P/E ratio of 6.3 +/−0.3.

12. The airfoil according to claim 1, wherein from 0% to 20% span +/−5% includes trip strips on the interior pressure surface.

13. The airfoil according to claim 1, wherein the interior pressure and suction surfaces include different trip strip configurations.

14. The airfoil according to claim 13, wherein the different trip strip configuration includes skewed and chevron features.

15. An airfoil for a gas turbine engine comprising:
spaced apart pressure and suction walls joined at leading and trailing edges to provide an airfoil, intermediate walls interconnecting the pressure and suction walls to provide cooling passageways, the cooling passageways having interior pressure and suction surfaces respectively provided on the pressure and suction walls; and
trip strips including a chevron-shaped trip strip that is provided on at least one of the interior pressure and suction surfaces, wherein the airfoil includes first, second and third span regions extending along a span that extends in the radial direction from 0% span near the platform to 100% span near the tip, the first span region extending 0-20% the span +/−5%, the second span region extending 20-60% the span +/−5%, and the third span extending 60-100% the span +/−5%, feed cavities are provided in the root and fluidly connected to the cooling passageways, wherein the feed cavities correspond to leading edge, midbody and trailing edge feed cavities, the leading edge feed cavity having first and second cooling passageways, the midbody feed cavity having third, fourth and fifth cooling passageways, and the trailing edge feed cavity having sixth, seventh and eighth cooling passageways, wherein the chevron trip strips extend from 0% to 60% span +/−5% in the second and sixth cooling passageways.

16. An airfoil for a gas turbine engine comprising:
spaced apart pressure and suction walls joined at leading and trailing edges to provide an airfoil, intermediate walls interconnecting the pressure and suction walls to provide cooling passageways, the cooling passageways having interior pressure and suction surfaces respectively provided on the pressure and suction walls; and
trip strips including a chevron-shaped trip strip that is at least one of the interior pressure and suction surfaces, wherein the airfoil includes first, second and third span regions extending along a span that extends in the radial direction from 0% span near the platform to 100% span near the tip, the first span region extending 0-20% the span +/−5%, the second span region extending 20-60% the span +/−5%, and the third span region extending 60-100% the span +/−5%, feed cavities are provided in the root and fluidly connected to the cooling passageways, wherein the feed cavities correspond to leading edge, midbody and trailing edge feed cavities, the leading edge feed cavity having first and second cooling passageways, the midbody cavity having, third, fourth and fifth cooling passageways, and the trailing edge feed cavity having sixth, seventh and eighth cooling passageways, wherein the chevron trip strips extend from 0% to 100% span +/−5% in the fifth cooling passageway.

17. An airfoil for a gas turbine engine comprising:
spaced apart pressure and suction walls joined at leading and trailing edges to provide an airfoil, intermediate walls interconnecting the pressure and suction walls to provide cooling passageways, the cooling passageways having interior pressure and suction surfaces respectively provided on the pressure and suction walls; and
trip strips including a chevron-shaped trip strip that is provided on at least one of the interior pressure and suction surfaces, wherein the airfoil includes first, second and third span regions extending along a span that extends in the radial direction from 0% span near the platform to 100% span near the tip, the first span region extending 0-20% the span +/−5%, the second span region extending 20-60% the span +/−5%, and the third span region extending 60-100% the span +/−5%, wherein from 0% to 20% span +/−5% includes no trip strips on the interior suction surface.

* * * * *

UNITED STATES PATENT AND TRADEMARK OFFICE
CERTIFICATE OF CORRECTION

PATENT NO.        : 9,157,329 B2
APPLICATION NO.   : 13/591773
DATED             : October 13, 2015
INVENTOR(S)       : Daniel C. Nadeau Page 1 of 1

It is certified that error appears in the above-identified patent and that said Letters Patent is hereby corrected as shown below:

IN THE CLAIMS:

In claim 1, column 6, line 44; after "walls;" insert --wherein the airfoil extends in a radial direction from a platform supported on a root to a tip, the cooling passageways extend in the radial direction;--

In claim 15, column 7, line 38; after "walls;" insert --wherein the airfoil extends in a radial direction from a platform supported on a root to a tip, the cooling passageways extend in the radial direction;--

In claim 16, column 8, line 13; after "walls;" insert --wherein the airfoil extends in a radial direction from a platform supported on a root to a tip, the cooling passageways extend in the radial direction;--

In claim 16, column 8, line 14; after "is" insert --provided on--

In claim 17, column 8, line 38; after "walls;" insert --wherein the airfoil extends in a radial direction from a platform supported on a root to a tip, the cooling passageways extend in the radial direction;--

Signed and Sealed this
Fifth Day of April, 2016

Michelle K. Lee
*Director of the United States Patent and Trademark Office*